United States Patent
Petitjean

[11] Patent Number: 6,094,545
[45] Date of Patent: Jul. 25, 2000

[54] DEFLECTOR/DIFFUSER/FLASH SYSTEM

[75] Inventor: Bernard A. Petitjean, Ludres, France

[73] Assignee: Peter Gray, Los Angeles, Calif.

[21] Appl. No.: 09/004,966

[22] Filed: Jan. 9, 1998

[51] Int. Cl.⁷ .................................................. G03B 11/00
[52] U.S. Cl. ............................................................ 396/544
[58] Field of Search ................................... 396/155, 174, 396/200, 544; 362/16, 17, 18

[56] References Cited

U.S. PATENT DOCUMENTS

| | | | |
|---|---|---|---|
| 3,687,030 | 8/1972 | Dine et al. | 396/544 |
| 3,836,927 | 9/1974 | Dine et al. | 396/544 |
| 4,078,170 | 3/1978 | Sloop | 396/200 |
| 5,337,104 | 8/1994 | Smith et al. | 396/200 |
| 5,778,264 | 7/1998 | Kean | 396/174 |

*Primary Examiner*—Russell Adams
*Attorney, Agent, or Firm*—Lyon & Lyon LLP

[57] ABSTRACT

There is disclosed herein an illumination directing apparatus for use with photographic cameras having a lens and a flash, and including at least one reflecting member for reflecting light from the flash of the camera toward a subject to be photographed. The apparatus is configured so as to provide light directly from the flash (either diffused or not) as well as reflected light from the flash (either diffused or not) directed at the subject and essentially from respective sides of the lens of the camera to thereby provide more even illumination on the subject.

24 Claims, 7 Drawing Sheets

DEFLECTOR/DIFFUSER/FLASH SYSTEM

The present invention relates to the field of photography, and more particularly to a method and system for providing even lighting in close-up photography situations and those involving medical photography.

BACKGROUND

Photographic film cameras, for example single lens reflex 35 mm cameras, have been used for medical photography, such as dental photography. Several forms of lighting are provided for close-up lighting with such cameras, such as those referred to as "macro-ring light" and "pointlight." A ring light is considered a shadowless light and illuminates an entire area. The ring light illuminates the total subject without shadows and is best used for special purposes, such as posterior intra-oral pictures, intra-oral mirror pictures, and the like. The pointlight is located on the end of the lens in a shadow casting light, and can be suitably rotated, but it creates a shadow on the subject. It is best used for shape and profile pictures such as orthodontic anterior views, dental models, and other applications where contour and depth of the subject are important. Also, combined ring and point lights have been provided.

Although these devices are useful with 35 mm cameras, they are not readily adaptable to some of the newer camera technology. More recently, digital camera technology has been developed. One of the problems with digital still cameras is that they do not allow for good close-up photographs with even lighting across the entire picture or recorded image. Part of the problem is occasioned by the relatively small size of digital cameras as well as the placement of their flash unit with respect to their lens.

SUMMARY OF THE INVENTION

The present invention provides a relatively simple device comprising a deflector or reflector with or without a diffuser and which can be simply attached to any one of a number of models of digital cameras to provide more even illumination. It essentially allows two beams of light, one directly from the flash of the camera and one reflected from the flash, to be directed on the subject. This is particularly important in close-up photographic situations, such as dental and other medical photographic applications.

Accordingly, it is a principal object of the present invention to provide an improved photographic lighting apparatus illumination directing assembly.

A further object of the present invention is to provide a new deflector for close-up flash photography for digital cameras.

A further object of the present invention is to provide a new diffuser for close-up flash photography for digital cameras.

A further object of the present invention is to provide a new deflector and diffuser for close-up flash photography for digital cameras.

BRIEF DESCRIPTION OF THE DRAWINGS

These and other objects and features of the present invention will become better understood through a consideration of the following description, taken in conjunction with the drawings in which.

DETAILED DESCRIPTION

Figure 1A:
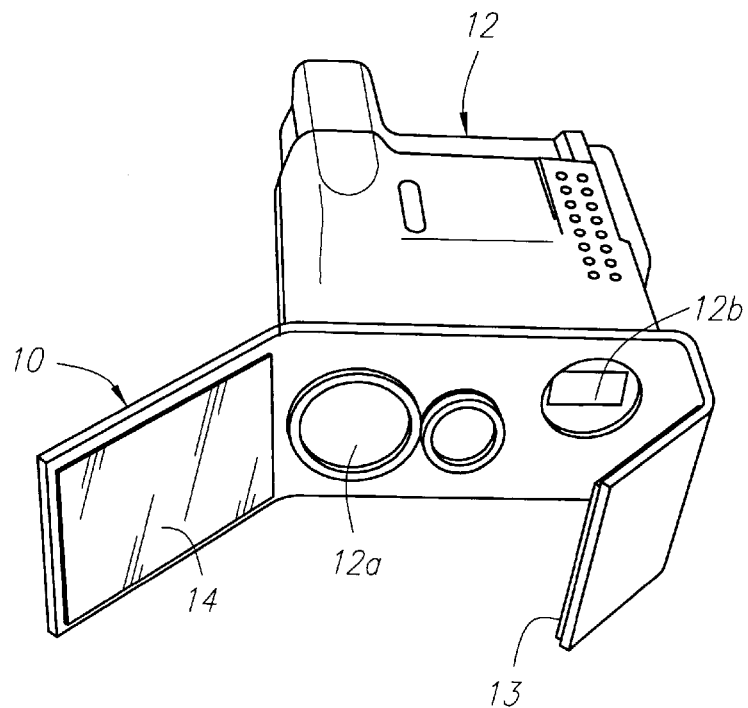
FIGS. 1a and 1b illustrate a first embodiment of the present invention comprising a deflector for close-up flash with a first type of digital camera.
Figure 1B:
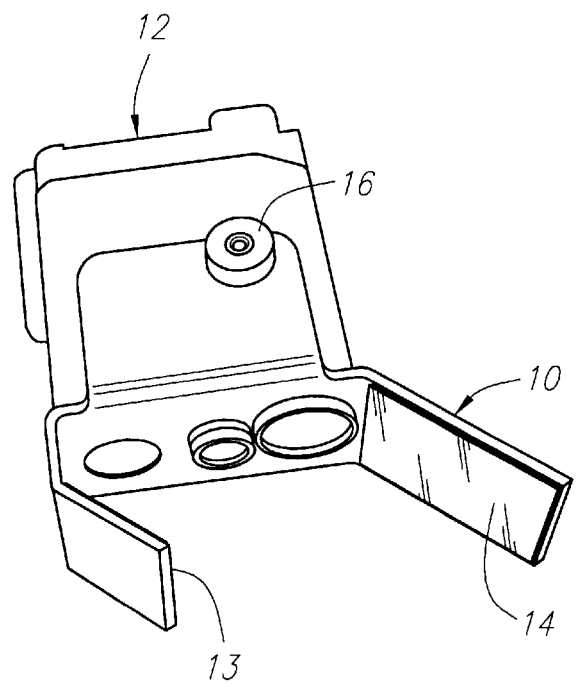

Turning now to the drawings, FIGS. 1a and 1b illustrate a first example of a deflector 10 according to the present invention attached to a Sony DKC-1D1 digital camera 12 for close-up flash photography. Although embodiments are shown and described for several particular models of cameras, it is to be understood that the concepts of the present invention are applicable to a variety of cameras, it only being necessary to size the device to fit with different cameras and provide reflectors and/or diffusers to suitably split the light from the flash to provide more even illumination on the subject being photographed.

Figure 2A:
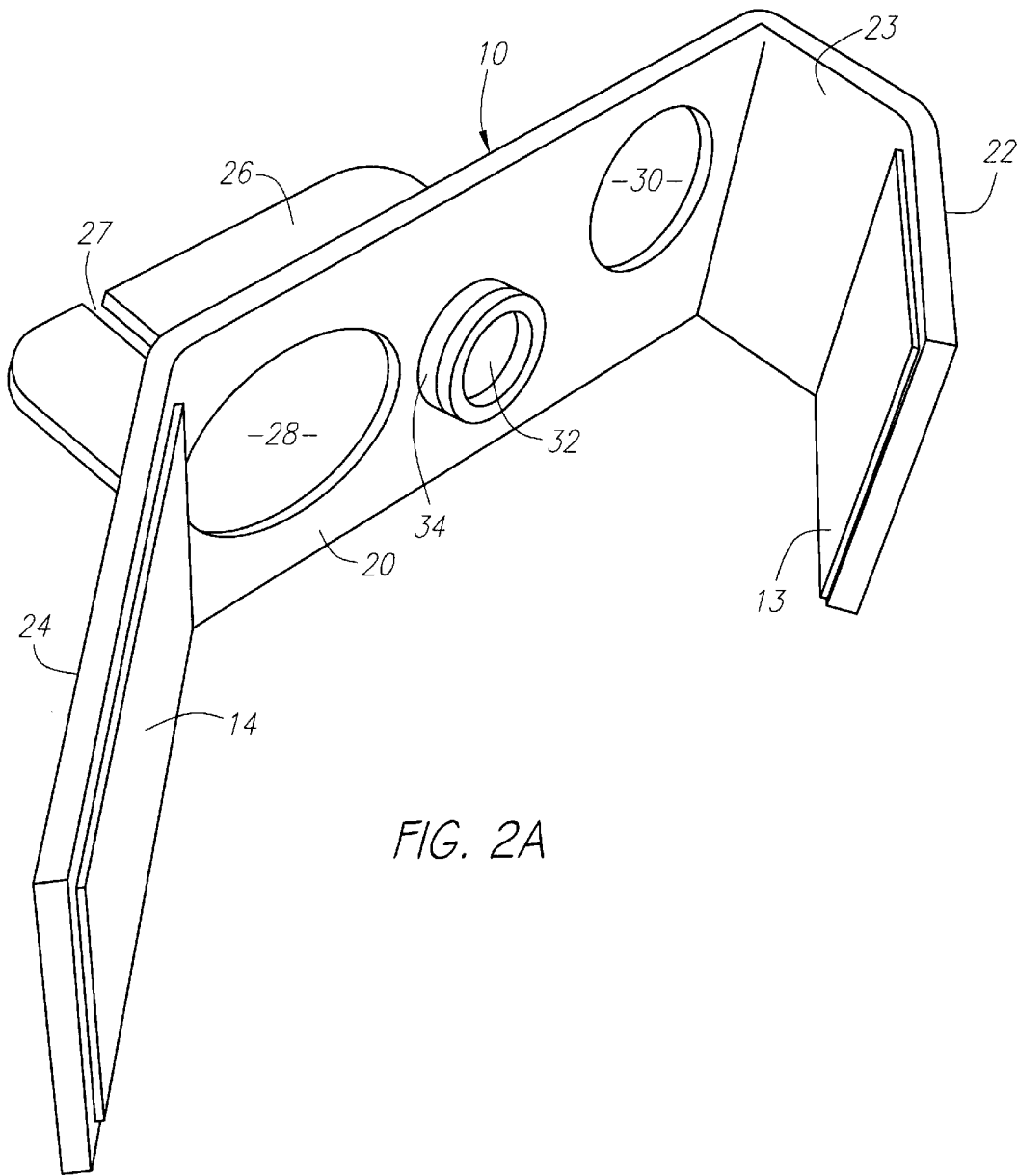
FIGS. 2a, 2b and 2c are more detail views of the deflector of FIGS. 1a–1b comprising respective detailed perspective, front and top views.
Figure 2B:
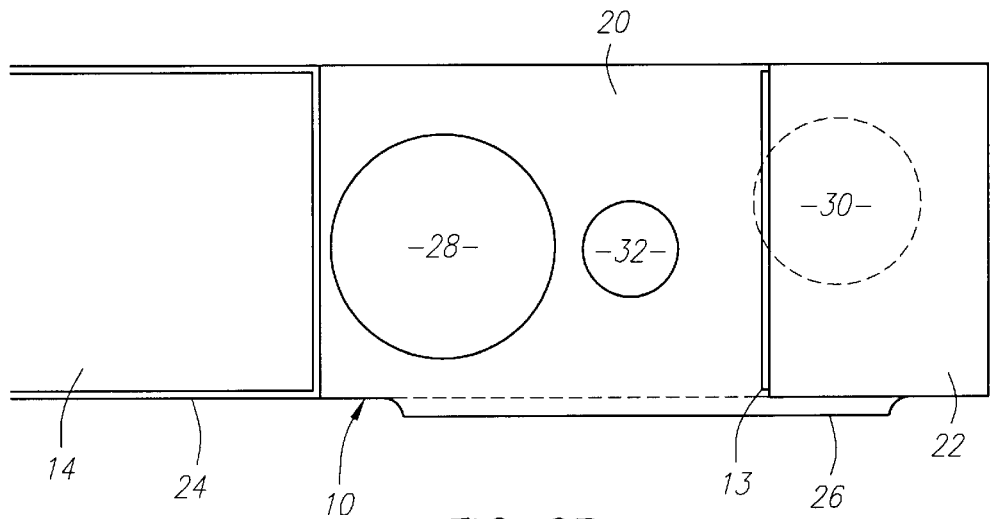
Figure 2C:
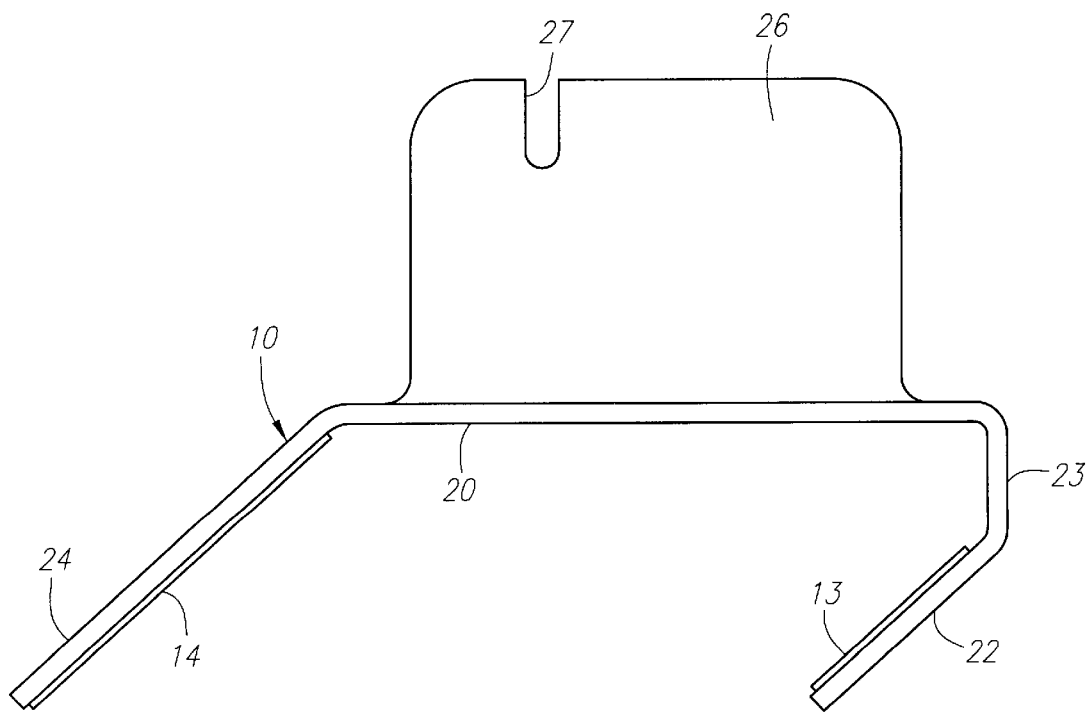

FIG. 1a illustrates the front and top of the camera 12 and deflector 10, and FIG. 1b shows the bottom of the camera 12 and the manner in which the deflector 10 is mounted on the camera. The camera lens is at 12a and flash at 12b. FIGS. 2a through 2c illustrate this deflector in greater detail.

As background, the SONY DKC-1D1 camera has a built-in macro zoom lens for close-up photography. A close-up lens may be screwed on the 37 mm thread for filters. On the camera the flash is 80 mm (about 3"5/32) from the lens. Therefore, most of the light normally (without the present invention) goes out of the left side of centered subject.

The deflector of the present invention works via a first mirror close to the left side of the flash which reflects part of the light from the flash onto a second mirror close to the right side of the lens. The result is the equivalent to a double flash, such as can be provided by NIKON SB-21B device.

The camera has a hole in front of its light sensor. On this hole can be fitted a NDX4 filter to enable a correction EV-3 that gives a smaller aperture lens increasing depth of field. The base of the deflector is suitably shaped to fit under the camera with a slot for a tripod screw. The correct angle between the two mirrors is controlled or set using a laser beam.

The deflector 10 includes a first mirror 13 for deflecting light from the electronic flash 12b of the camera to a second mirror 14 which directs the flash light onto the close-up subject being photographed to provide more even illumination. This arrangement essentially provides two beams of light on either side of the camera lens toward the subject, one directly from the flash and the other reflected light from the flash.

It will be noted from FIGS 1a and 1b that the deflector 10 is disposed on the front of the camera 12, and from FIG. 1b the same is attached to the bottom 15 of the camera 12 at its tripod mount (not seen) of the camera 12 by a typical tripod screw 16.

The diffuser 10 includes four sections which preferably are integrally formed from one piece of suitable plastic, namely a front section 20, a first mirror section 22, second mirror section 24, and a mounting section 26. The front section 20 is flat or planar and includes three openings, a first opening 28 for the lens 12a of the associated camera, a second opening 30 for the flash 12b of the camera, and a third opening 32 for the light sensor of the camera. In some instances, it is desirable to provide a neutral density or other filter 35 over the light sensor of the camera, and in this case, the central hole 32 will be sufficiently large to accommodate such a filter, or the front section 20 may include a ring or bracket 34 to which the filter 35 can be attached, as via a clip-on mount.

The base section 26 includes an aperture 27 to allow the base, and consequently the deflector 10, to be attached to the bottom 15 of the camera 12 as noted earlier. The first mirror section 22 is disposed at an angle of 45 degrees with respect to the front section 20 by an arm 23 that extends perpendicularly outward from the front section 20. Similarly, the second mirror section 24 is disposed at 45 degrees with respect to the front section 20. This arrangement provides the two beams of light noted above.

In considering dental photography, the mouth of a person is a cavity and it is important to provide shadowless lighting which, in the past, has been provided with film cameras by a ring flash or the like. Two sources of flash illumination close to the lens can function in a similar manner. However, on some digital cameras, such as the Sony DKC-1D1 there is a single flash which is relatively far from the lens. The arrangement of the deflector 10 allows an amount of flash light from the flash unit of the camera to reach the subject, and to deflect part of that flash light from the flash 12b, to a first mirror 13, and onto a second mirror 14 on the opposite side of the lens, thereby providing essentially a twin beam of light, giving a more balanced lighting emanating from both sides of the lens. In some instances, the light from the flash of the camera is too powerful and it is necessary to reduce light from the flash as will be noted below, in connection with the second embodiment for use with a Sony MVC-FD7 camera. The mirrors 13 and 14 preferably are clear, reflective mirrors and not of a diffusing type in the case of the Sony DKC-1D1 camera.

Figure 3A:
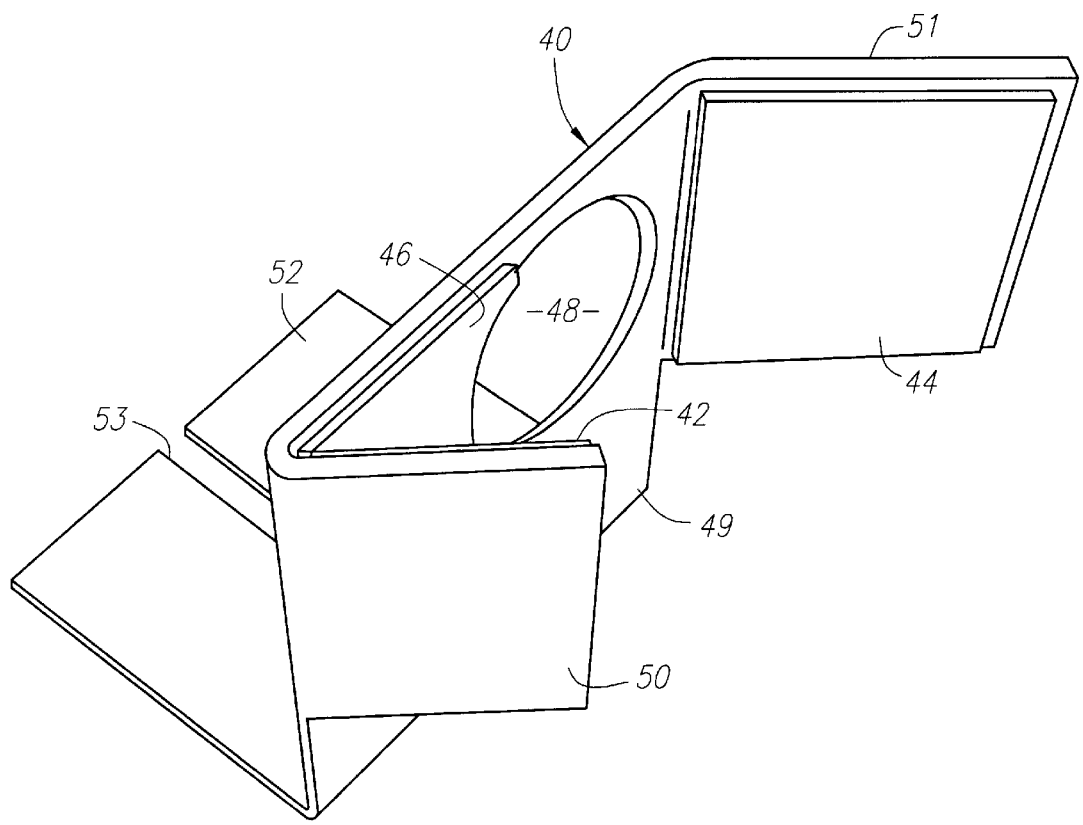
FIGS. 3a, 3b and 3c are respective detailed perspective, front and top views of a diffuser for another type of digital camera.
Figure 3B:
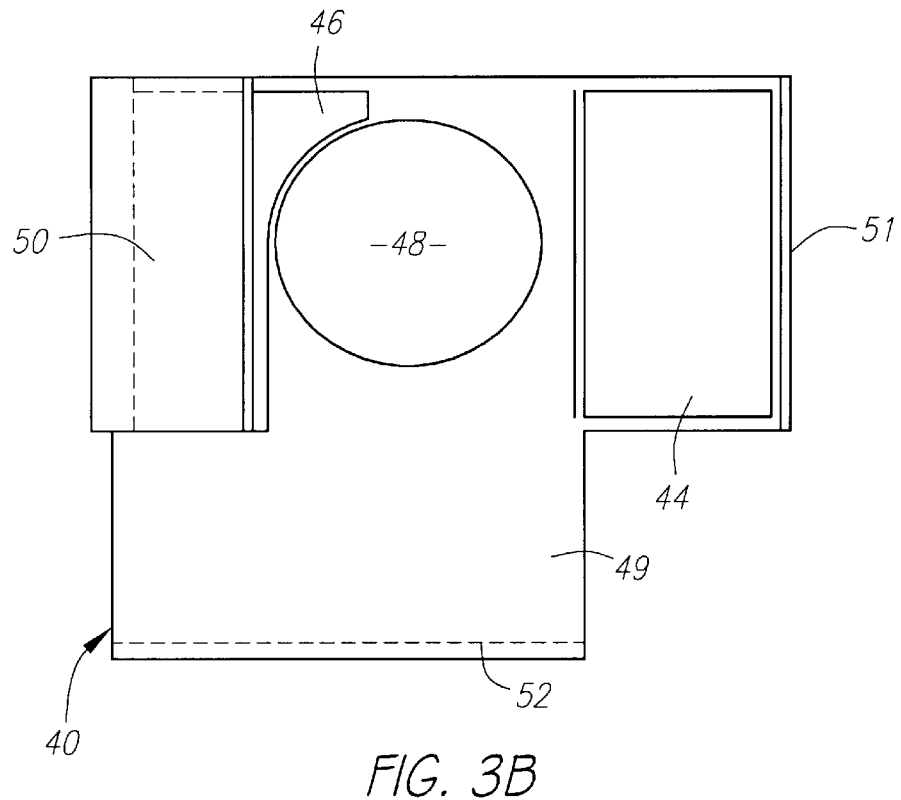
Figure 3C:
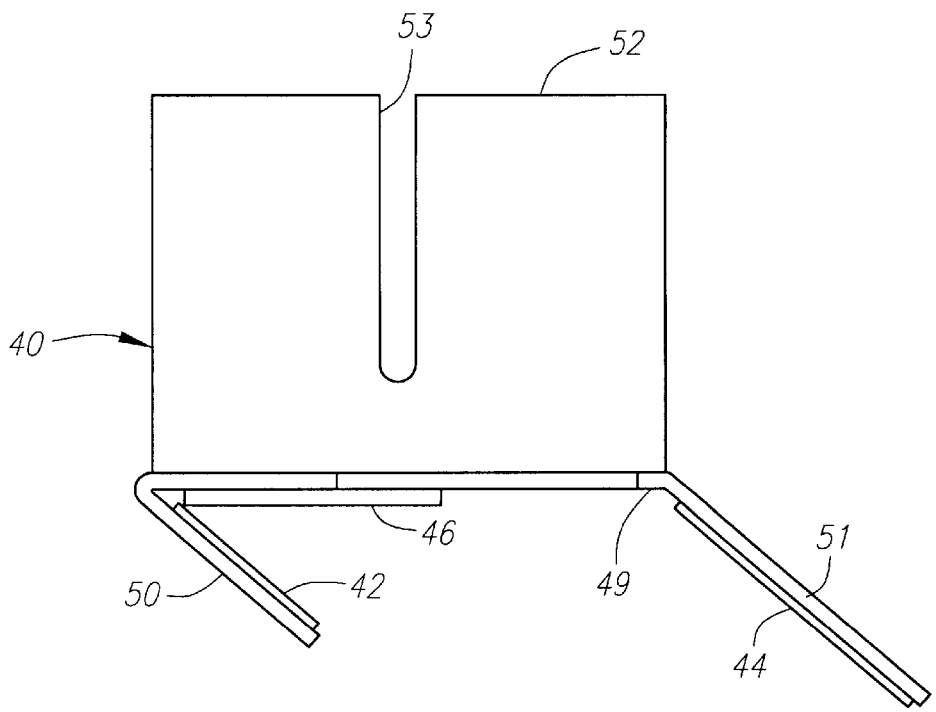

A second embodiment is shown in FIGS. 3a–3c, this one for a Sony MVC-FD7 camera. This device is referred to as a "diffuser" having a first frosted mirror 42, a second frosted mirror 44 and a mirror light reducer 46. This particular camera has a very sensitive light sensor CCD and, therefore, it is necessary to strongly reduce the flash light. This is accomplished by using diffusing plexiglass at 46 and which, further, preferably is coated on both sides with chromium to add slightly mirrored surfaces to function as a light reducer. The Sony MVC-FD7 camera (not shown) has a lens for which an opening 48 is provided in the diffuser 40, and the flash and light sensor of this camera are disposed behind the mirror light reducer 46.

The diffuser 40, similar to the deflector 10 described earlier, has a planar front section 49, first mirror section 50, second mirror section 51, and an attachment base 52 with a notch 53 for attaching the diffuser 40 to the camera via a tripod screw in the manner previously described. The mirror sections 50 and 51 are disposed at 45 degrees with respect to the front section 49 as best seen in FIG. 3c.

Figure 4A:
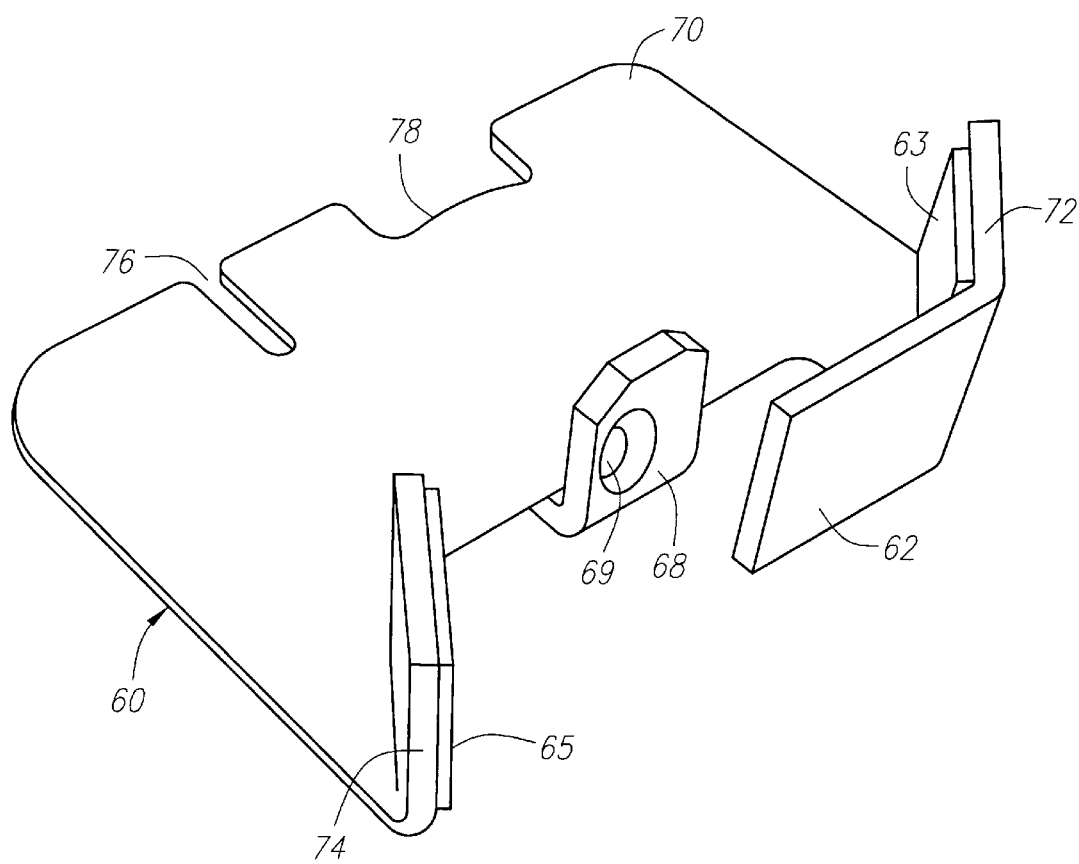
FIGS. 4a, 4b and 4c are respective detailed perspective, front and top views of another form of diffuser for still another digital camera.
Figure 4B:
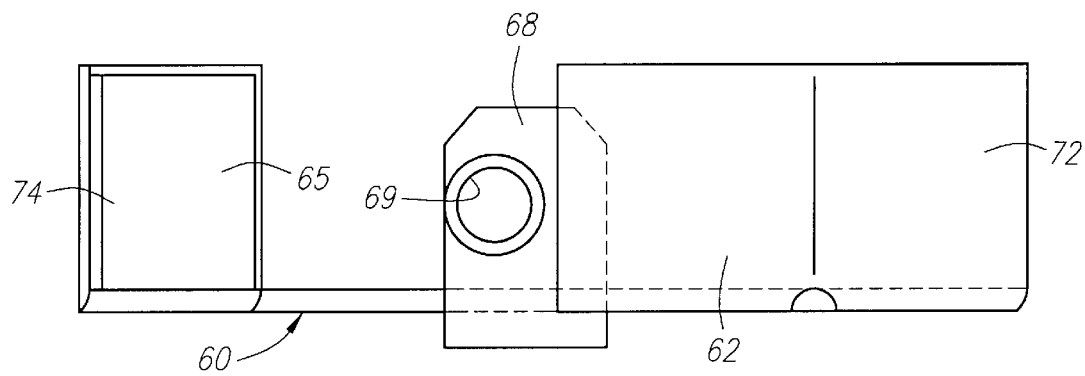
Figure 4C:
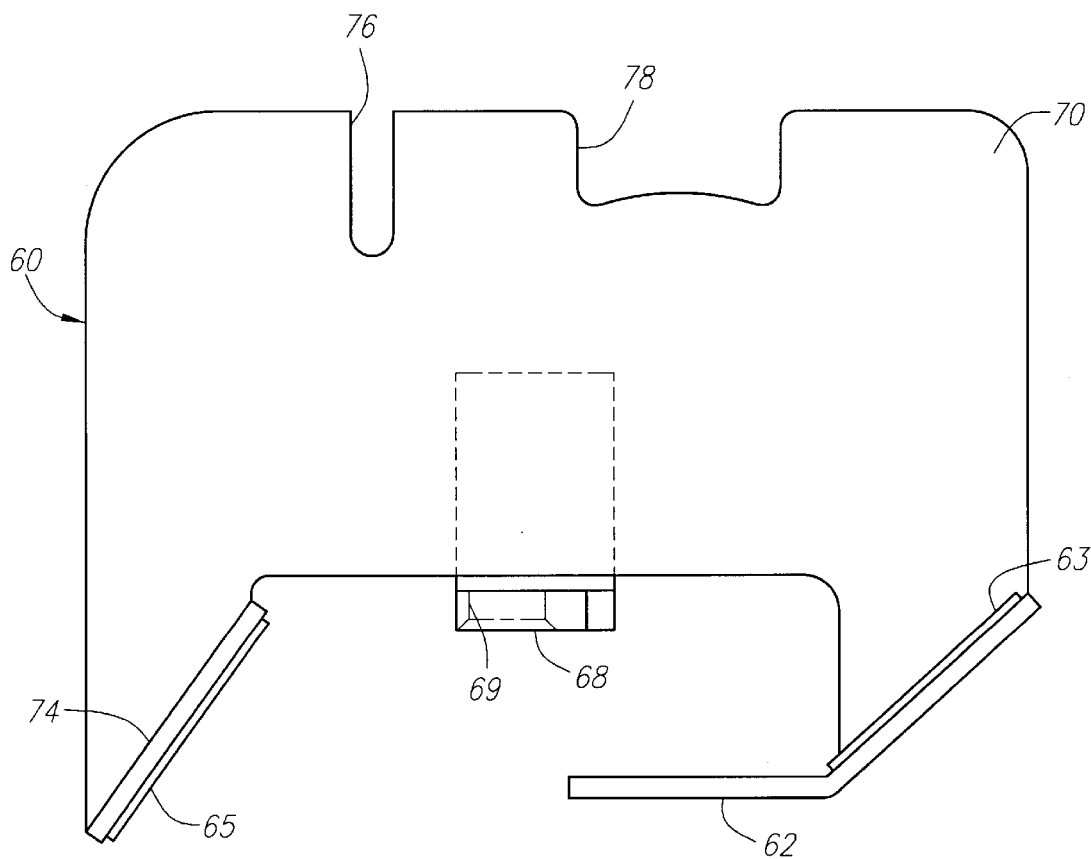

Turning now to FIGS. 4a–4c, a diffuser for close-up flash for a Ricoh RDC-2 camera is illustrated. This camera has a built-in macro lens for close-up photography with a very short working distance, with an f:5.6 mm lens of 30 mm (about 1"3/16). At this distance the field is roughly the same as ¼ with a 35 mm macro lens. The camera flash is 85 mm (about 3"11/32) from the lens. Therefore, most of the light goes on the left side of the centered subject. The diffuser 60 works for this camera in two ways; namely to provide direct light, and to reflect light.

With regard to direct light, the flash is very close to the subject and there is an over-exposure which is out of control of the camera. Thus, a diffuser is used to reduce 50% of the direct light. Direct light illuminates the left side of the subject. With regard to reflected light, light is reflected by two mirrors, the first on the left side close to the flash reflects a part of the light onto a second mirror near the right side of the lens. The second mirror is frosted to give a soft light balance with diffused direct light. The result is equivalent to a double flash, such as NIKON SB-21B.

This diffuser 60 comprises a diffuser 62 for direct light from the flash of the camera, a first mirror 63 for reflecting light from the flash, a second frosted mirror 65, and a hood 68 with an opening 69 which is positioned adjacent the lens (not shown) of the camera to minimize flare. The hood 68 preferably is black and is located in front of the sensor to avoid a flare on the right side of the photograph due to the light reflected by the first mirror. The hood 68 can be integrally formed or can be a separate piece (as shown) suitably attached (as by an adhesive) to the base 70.

The diffuser 60 includes a base 70 for appropriately supporting a first mirror section 72, diffuser section 62, second mirror section 74, and hood 68. The base 70 includes a notch 76 for a tripod screw, and further includes a notch 78 for the ejection lever (not shown) of a Ricoh RDC-2 camera.

Each of the present deflectors and diffusers preferably is formed of a single sheet of plastic, and the mirrors and diffusers are attached with any suitable adhesive. An exemplary plastic is a translucent and diffusing acrylic plastic, such as polymethylmethacrylate such as Plexiglass. This material preferably has a light transmission power of about 40% for the Ricoh and Sony DKC-1D1 cameras and 7% for the Sony MVC-FD7. Also, this material has both good optical capabilities and it is relatively easy to cut and to bend and, further, also has a good mechanical strength and rigidity.

In order to provide further details of an exemplary embodiment, here are typical dimensions for the FIG. 2 embodiment. The middle section 20 is approximately 95 mm wide and 74 mm high, with a 40 mm diameter hole 28, 14 mm diameter hole 32, and 30 mm diameter hole 30. The reflector 10 is approximately 4 mm thick, with the mirrors 13 and 14 being approximately 2 mm thick. The section 22 is approximately 50 mm wide, with the arm 23 being approximately 28 mm wide, and the second mirror 24 approximately 87 mm wide. The mounting section 26 is approximately 24 mm deep with a 7 mm wide and 19 mm long slot 27. As noted earlier, the configuration and dimensions of diffusers or deflectors can be varied to suitably fit with the camera involved so as to provide direct flash light (either diffused or not) along with reflected flash light (either diffused or not) so as to essentially split the light from the flash into essentially two beams to thereby provide more even illumination on the subject being photographed.

As will be apparent from the three exemplary embodiments described and shown herein, the configuration of a deflector, lots diffuser or deflector/diffuser for other cameras may have a different configuration of the mirrors and diffusers, but all are within the scope of the concepts of the present invention which is to provide more even close-up illumination of a subject by providing essentially two beams or flashes emanating from the camera and deflector/diffuser assembly combination from the vicinity of both sides of the camera lens.

While embodiments of the present invention have been shown and described, various modifications may be made without departing from the scope of the present invention, and all such modifications and equivalents are intended to be covered.

What is claimed is:

1. An illumination directing apparatus for use with a digital photographic camera and the like having a lens and a flash, including a first member for enabling attachment to the camera, and including at least one reflecting member for reflecting light directly from the flash of the camera toward a close-up subject to be photographed whereby diffused light directly from the flash and undiffused reflected light from the flash are directed at the subject from respective sides of the lens of the camera.

2. An apparatus as in claim 1 further including a second reflecting member for reflecting light from the first reflecting member toward the close-up subject.

3. An apparatus as in claim 1 wherein said reflecting member comprises a first frosted mirror, and wherein the apparatus further includes a second frosted mirror, the first frosted mirror being disposed to reflect light to the second frosted mirror which, in turn, reflects light toward the close-up subject.

4. An apparatus as in claim 3 wherein the apparatus includes a front section having an aperture for the lens of the camera, and has a light reducer disposed adjacent the flash of the camera.

5. An apparatus as in claim 1 wherein the reflecting member comprises a first mirror, and the apparatus includes a second mirror for receiving light from the first mirror and reflecting the same toward the close-up subject, and the apparatus further includes a diffuser disposed adjacent the flash for diffusing direct light from the flash to thereby provide a relatively balanced set of light beams (1) directly from the flash through the diffuser, and (2) reflected from the flash via the first and second mirrors with the beams being directed toward the subject from both sides of the lens of the camera.

6. An illumination apparatus for use with a digital photographic camera having a lens and a flash, and including a first member for enabling attachment of the apparatus to the camera, and including at least one reflecting member for reflecting light from the flash of the camera toward a close-up subject to be photographed to thereby provide light emanating from respective sides of the camera lens toward the close-up subject, said emanating light comprising (1) diffused light directly from the flash, and (2) the undiffused reflected light.

7. An apparatus as in claim 6 further including a second reflecting member for reflecting light from the first reflecting member toward the close-up subject.

8. An apparatus as in claim 6 wherein said reflecting member comprises a first frosted mirror, and wherein the apparatus further includes a second frosted mirror, the first frosted mirror being disposed to reflect light to the second frosted mirror which, in turn, reflects light toward the close-up subject.

9. An apparatus as in claim 8 wherein the apparatus includes a front section having an aperture for the lens of the camera, and has a light reducer disposed adjacent the flash of the camera.

10. An apparatus as in claim 6 wherein the reflecting member comprises a first mirror, and the apparatus includes a second mirror for receiving light from the first mirror and reflecting the same toward the close-up subject, and the apparatus further includes a diffuser disposed adjacent the flash for diffusing direct light from the flash to thereby provide a relatively balanced set of light beams (1) directly from the flash through the diffuser, and (2) reflected from the flash via the first and second mirrors with the beams being directed toward the subject from both sides of the lens of the camera.

11. An illumination apparatus for use with a digital photographic camera having a lens and a flash, and including at least one reflecting member for reflecting light from the flash of the camera toward a subject to be photographed to thereby provide light emanating from respective sides of the camera lens toward the subject, said emanating light comprising (1) diffused light directly from the flash, and (2) the undiffused reflected light.

12. An method of providing more even illumination on a close-up subject to be photographed using a digital photographic camera having a lens and a flash, comprising the steps of simultaneously providing diffused direct light from the flash toward the subject, and reflecting undiffused light from the flash toward the subject so as to provide light effectively emanating substantially from respective sides of the camera lens.

13. An illumination directing apparatus for use with a digital photographic camera and the like having a lens and a flash, including a first member for enabling attachment to the camera, and including at least one reflecting member for reflecting light directly from the flash of the camera toward a close-up subject to be photographed whereby undiffused light directly from the flash and diffused reflected light from the flash are directed at the subject from respective sides of the lens of the camera.

14. An apparatus as in claim 13 further including a second reflecting member for reflecting light from the first reflecting member toward the close-up subject.

15. An apparatus as in claim 13 wherein said reflecting member comprises a first frosted mirror, and wherein the apparatus further includes a second frosted mirror, the first frosted mirror being disposed to reflect light to the second frosted mirror which, in turn, reflects light toward the close-up subject.

16. An apparatus as in claim 15 wherein the apparatus includes a front section having an aperture for the lens of the camera, and has a light reducer disposed adjacent the flash of the camera.

17. An apparatus as in claim 13 wherein the reflecting member comprises a first mirror, and the apparatus includes a second mirror for receiving light from the first mirror and reflecting the same toward the close-up subject, and the apparatus further includes a diffuser disposed adjacent the flash for diffusing direct light from the flash to thereby provide a relatively balanced set of light beams (1) directly from the flash through the diffuser, and (2) reflected from the flash via the first and second mirrors with the beams being directed toward the subject from both sides of the lens of the camera.

18. An illumination apparatus for use with a digital photographic camera having a lens and a flash, and including a first member for enabling attachment of the apparatus to the camera, and including at least one reflecting member for reflecting and diffusing light from the flash of the camera toward a close-up subject to be photographed to thereby provide light emanating from respective sides of the camera lens toward the close-up subject, said emanating light comprising (1) undiffused light directly from the flash, and (2) the diffused reflected light.

19. An apparatus as in claim 18 further including a second reflecting member for reflecting light from the first reflecting member toward the close-up subject.

20. An apparatus as in claim 18 wherein said reflecting member comprises a first frosted mirror, and wherein the apparatus further includes a second frosted mirror, the first frosted mirror being disposed to reflect light to the second frosted mirror which, in turn, reflects light toward the close-up subject.

21. An apparatus as in claim 20 wherein the apparatus includes a front section having an aperture for the lens of the camera, and has a light reducer disposed adjacent the flash of the camera.

22. An apparatus as in claim 18 wherein the reflecting member comprises a first mirror, and the apparatus includes a second mirror for receiving light from the first mirror and reflecting the same toward the close-up subject, and the apparatus further includes a diffuser disposed adjacent the flash for diffusing direct light from the flash to thereby provide a relatively balanced set of light beams (1) directly from the flash through the diffuser, and (2) reflected from the flash via the first and second mirrors with the beams being directed toward the subject from both sides of the lens of the camera.

23. An illumination apparatus for use with a digital photographic camera having a lens and a flash, and including at least one reflecting member for reflecting and diffusing light from the flash of the camera toward a subject to be photographed to thereby provide light emanating from respective sides of the camera lens toward the subject, said emanating light comprising (1) undiffused light directly from the flash, and (2) the diffused reflected light.

24. A method of providing more even illumination on a close-up subject to be photographed using a digital photographic camera having a lens and a flash, comprising the steps of simultaneously providing direct undiffused light from the flash toward the subject, and reflecting diffused light from the flash toward the subject so as to provide light effectively emanating substantially from respective sides of the camera lens.

* * * * *